(12) United States Patent
Vallee

(10) Patent No.: US 6,612,844 B1
(45) Date of Patent: *Sep. 2, 2003

(54) EDUCATIONAL AID AND METHOD

(76) Inventor: Harold C. Vallee, 4535 Jaquima Dr., Angels Camp, CA (US) 95222

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/536,536

(22) Filed: Mar. 28, 2000

(51) Int. Cl.⁷ .............................................. G09B 19/00
(52) U.S. Cl. ...................................... 434/156; 434/165
(58) Field of Search ................................ 434/157, 165, 434/188, 209, 178, 156; 273/299, 300, 301, 302, 308

(56) References Cited

U.S. PATENT DOCUMENTS

| | | | | |
|---|---|---|---|---|
| 1,327,019 A | * | 1/1920 | Britton | 273/300 |
| 2,154,891 A | * | 4/1939 | Dodge | 273/302 |
| 5,275,569 A | | 1/1994 | Watkins | |
| 5,310,347 A | * | 5/1994 | Brand | 434/167 |
| 5,421,731 A | * | 6/1995 | Walker | 434/167 |
| 5,486,111 A | | 1/1996 | Watkins | |
| 5,492,473 A | | 2/1996 | Shea | |
| 5,547,199 A | * | 8/1996 | Calhoun | 273/299 |
| 5,713,739 A | | 2/1998 | Yu | |
| 5,743,740 A | * | 4/1998 | Visser | 434/128 |
| 5,836,587 A | * | 11/1998 | Druce | 273/296 |
| 5,868,393 A | * | 2/1999 | Williams | 273/299 |
| 5,899,698 A | * | 5/1999 | Sandlin | 434/157 |
| 5,927,719 A | * | 7/1999 | Young | 273/302 |
| 5,934,708 A | | 8/1999 | Batjuk | |
| 5,957,693 A | * | 9/1999 | Panec | 434/178 |
| 6,210,170 B1 | * | 4/2001 | Sorensen | 434/323 |

OTHER PUBLICATIONS

Alan Durband, "Shakespeare Made Easy: King Lear", 1986.*
Jana Spacilova, "Black Beauty", 1998.*
Beverly S. Krueger, "Shakespeare for All Ages", <http://eho.org/features/shake.htm>, 1997.*
Imogene Forte & Joy Mackenzie; "Early Learning in Creative Writing"; pp. 20–22; 1996; Incentive Publications, Inc., Nashville, TN.
Gail Heald–Taylor & Roger C. Farr; "Improving Reading Comprehension"; pp. 79–81; 1999; Steck–Vaughn Company.
"Parallel Bible: Updated New American Bible: New International Version": pp. 750–752; 1999; Zondervan Corporation, Grand Rapids, MI.
Diana Hacker; "Rules for Writers: Third Edition" pp. 214–216; Bedford Books, Boston, MA.

* cited by examiner

*Primary Examiner*—Derris H. Banks
*Assistant Examiner*—Kurt Fernstrom
(74) *Attorney, Agent, or Firm*—Milord & Associates, PC; Milord A. Keshishian

(57) ABSTRACT

An educational aid that provides a surface, such as a page in a book, that is sectioned into at least two sections. A plurality of concepts are presented in the first section and a plurality of concepts are presented in the second section that relate to the subject matter of the first section. The concepts are at least linguistic, mathematical, and artistic and allow the user to compare the more complex concepts with the simpler concepts and thereby increase the learning curve by building upon an already learned concept.

14 Claims, 3 Drawing Sheets

EDUCATIONAL AID AND METHOD

FIELD OF THE INVENTION

This invention relates to educational aids and methods therefor and particularly to an apparatus that presents concepts in sections that proceed from simple to more advanced in a gradational fashion.

BACKGROUND OF THE INVENTION

Instructional aids have been used previously for educational purposes; however, they have had several disadvantages. U.S. Pat. No. 5,492,473 to Shea discloses a language instruction and fact recognition apparatus. The apparatus provides a plurality of master charts with words thereon, a plurality of study cards with words thereon, a complicated reference system for matching the right cards to the right master charts, and two separate apparatuses for maintaining the cards and the master charts. However, storing and transporting the master charts and the cards can become cumbersome in addition to the loss of the cards.

U.S. Pat. Nos. 5,486,111 and 5,275,569, both issued to Watkins, disclose a language translation teaching aid that presents a first sentence, a second sentence in a second language with a word-for-word translation, and a third sentence in the second language with an accurate translation of the first sentence according to the normal rules of syntax and grammar of the second language. However, the number of phrases that can be presented limits Watkins and most often the phrases that are presented are not useful to the person learning the language because they may apply to impractical phrases.

U.S. Pat. No. 5,713,739 to Yu discloses a learning aid for use in language education. The invention includes a foldable structure that receives a plurality of inserts. A first set of inserts present the target language, a second set of inserts present the known language, and a third set of inserts present the transition between the known language and the target language. Yu is limited to only teaching foreign languages based on a known language and the plurality of inserts may become misplaced or lost and the coordination of corresponding inserts is time consuming and cumbersome.

U.S. Pat. No. 5,934,708 to Batjuk discloses a dictionary of an alphabetic foreign language in which a word is defined in a known language, but a plurality of other words having an identical sequence of letters of the original foreign language word are grouped therewith. However, Batjuk requires the use of additional space on the paper to arrange corresponding words thereon that may be related in sequence but unrelated in meaning and will increase the size of the book and deplete resources unnecessarily. The fragmented presentation of unrelated words does not provide a logical reasoning for increased learning of the user.

The prior art does not address the need for an apparatus that provides a graduated teaching tool that allows the user to learn and build on a simple concept in a graduated fashion. Therefore, there remains a long standing and continuing need for an advance in the art of teaching aids and educational methods that is simpler in both design and use, is more economical, efficient in its construction and use, and eliminates the need for a plurality of corresponding cards that may be misplaced or lost.

SUMMARY OF THE INVENTION

Accordingly, it is a general object of the present invention to overcome the disadvantages of the prior art.

In particular, it is an object of the present invention to provide a teaching aid that reduces the number of disassociated members and reduces the risk of loss thereof.

It is another object of the present invention to provide an educational aid that provides the reader a gradual expansion and complexity of several concepts.

It is another object of the present invention to provide an educational aid that extends the life thereof by allowing the same educational aid to be used as the reader develops their reading ability and vocabulary.

It is another object of the present invention to provide an educational aid that allows the presenter to present the concepts in a gradually developing complex fashion.

It is another object of the present invention to provide an educational aid that allows collaboration between a less complex presenter and a more complex presenter that expands on the less complex concepts.

It is yet another object of the present invention to provide an educational aid that allows a reader to comprehend an alternate style of writing such as an Elizabethan style.

It is a further object of the present invention to provide an educational aid that is less costly to manufacture and produce.

In keeping with the principles of the present invention, a unique educational aid that has at least a surface, and can have a plurality of surfaces such as pages in a book, wherein the surface is separated into at least two sections. At least a first concept is presented in the first section and is expanded upon in a second section in a more complex fashion.

The concepts that are presented may be linguistic, mathematical, or artistic in nature and each section provides a more complex presentation than the previous section. In maintaining the successively complex concepts on the same page, the reader is able to simultaneously view the previous simple concept and build thereupon to develop a better apprehension of the more complex concepts. Furthermore, the book or other medium that the concepts are presented upon may be reused as the reader develops a broader understanding of the concepts.

Such stated objects and advantages of the invention are only examples and should not be construed as limiting the present invention. These and other objects, features, aspects, and advantages of the invention herein will become more apparent from the following detailed description of the embodiments of the invention when taken in conjunction with the accompanying drawings and the claims that follow.

BRIEF DESCRIPTION OF THE DRAWINGS

It is to be understood that the drawings are to be used for the purposes of illustration only and not as a definition of the limits of the invention.

In the drawings, wherein similar reference characters denote similar elements throughout the several views.

DETAILED DESCRIPTION OF THE INVENTION

Figure 1:
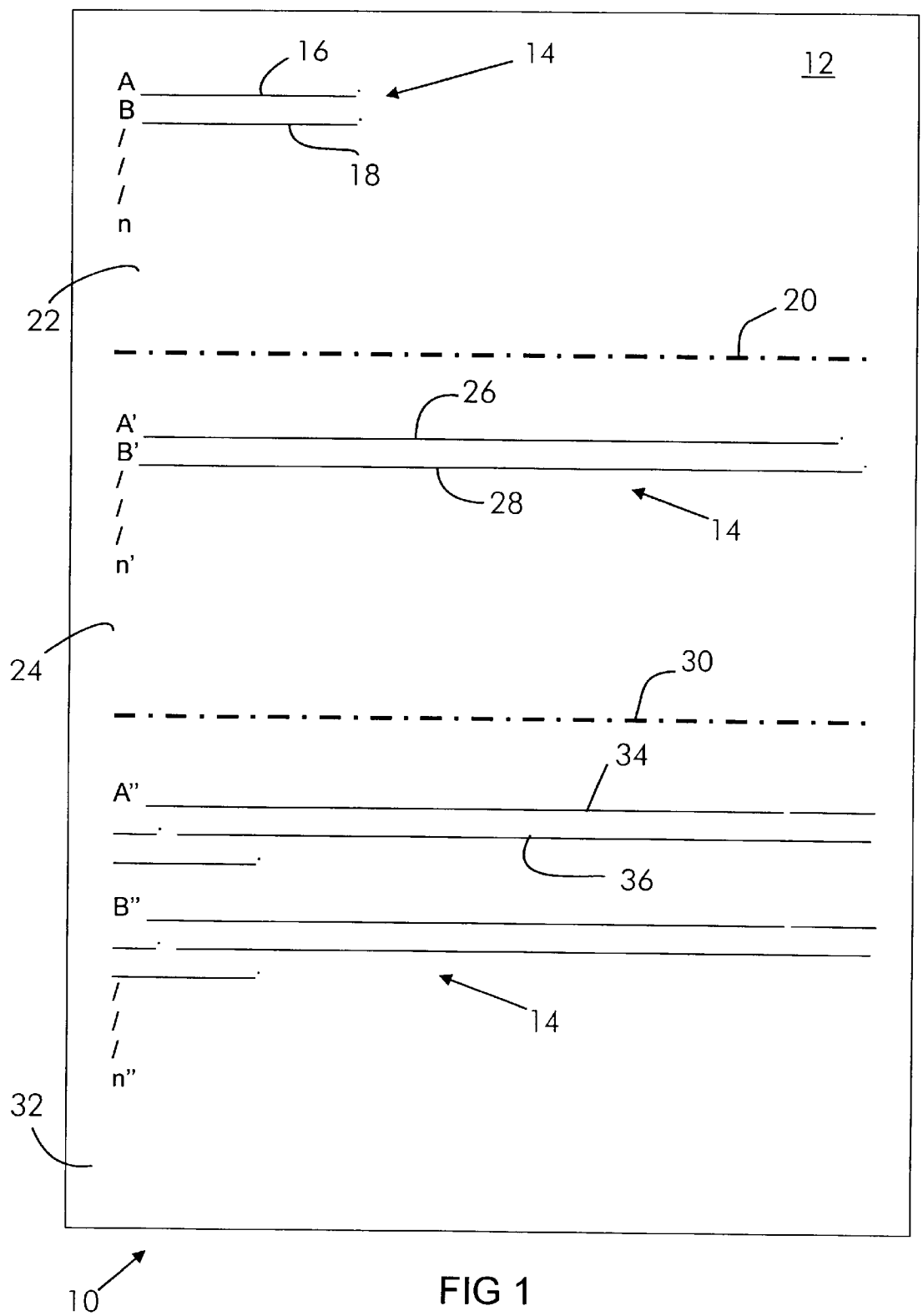
FIG. 1 is a top plan view of a surface illustrating the different concepts thereon as presented in the different sections.
Figure 2:
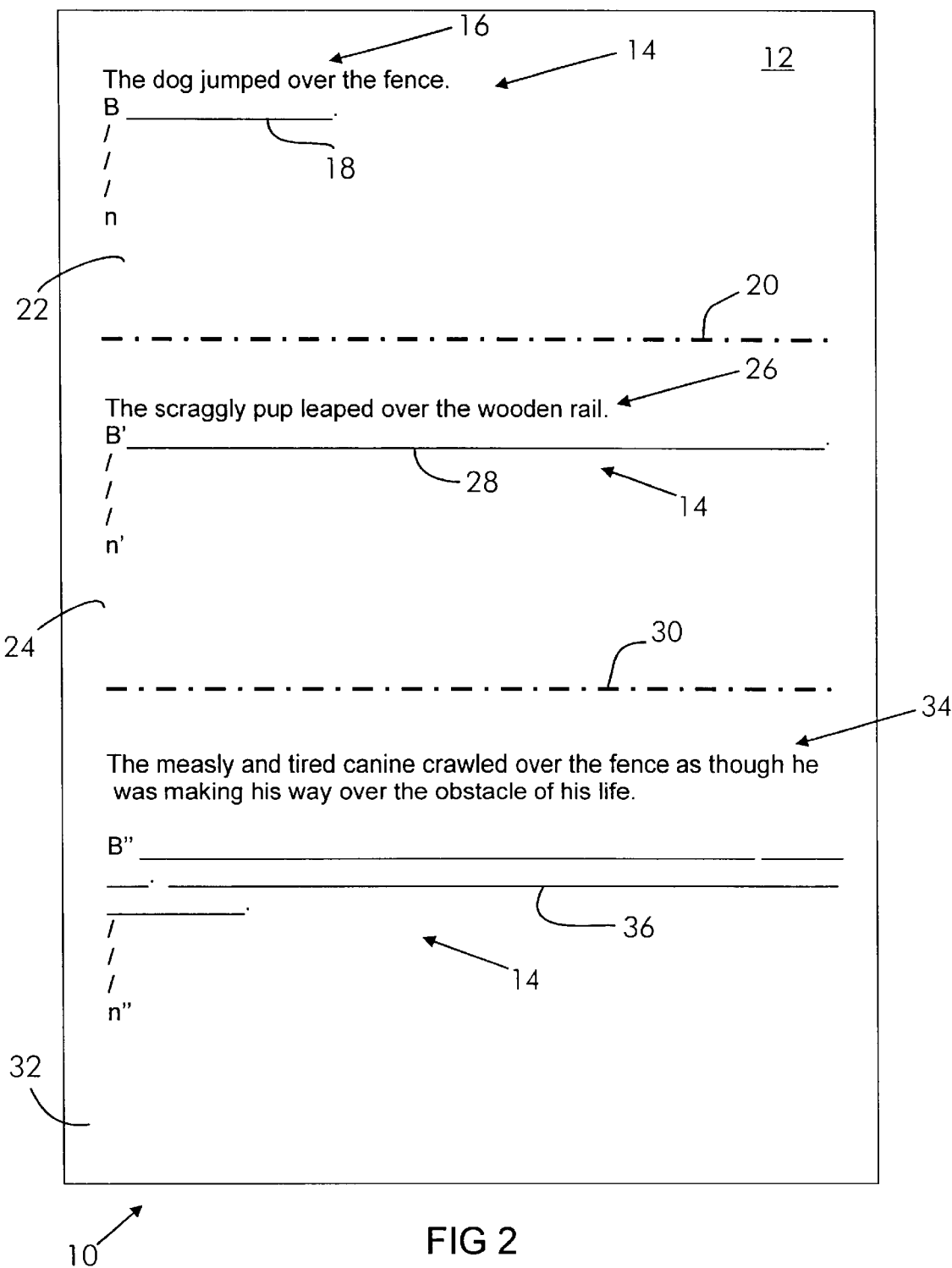
FIG. 2 is a top plan view of a surface illustrating the different linguistic concepts thereon as presented in the different sections.
Figure 3:
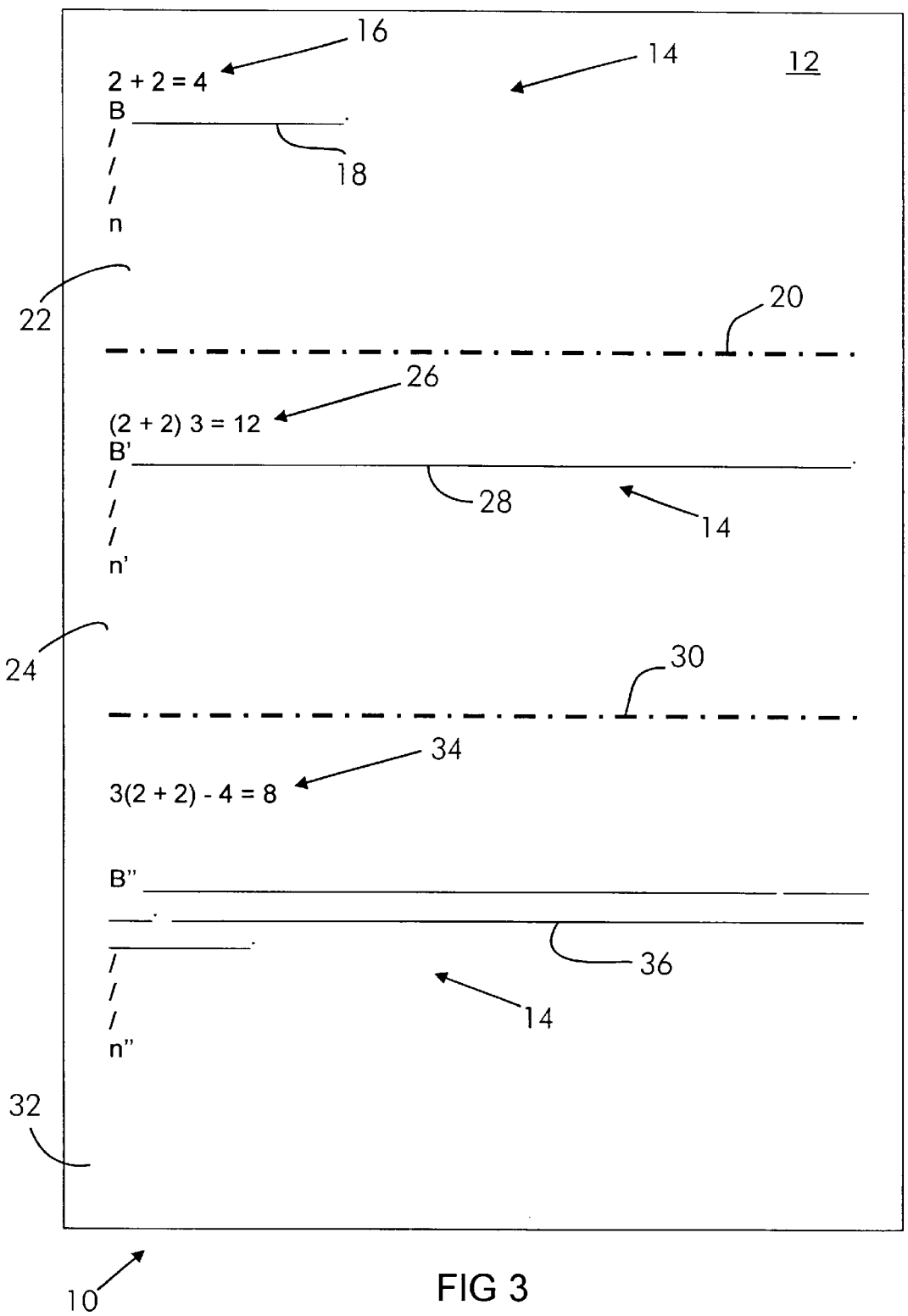
FIG. 3 is a top plan view of a surface illustrating the different mathematical concepts thereon as presented in the different sections.

Referring to FIGS. 1, 2, and 3, therein is illustrated an educational aid 10 having a surface 12. Surface 12 may be of any medium whereon a plurality of indicia 14 is presented. In a preferred embodiment, surface 12 may be a sheet of paper or a page in a book; however, it is to be understood that surface 12 may be a monitor, a television screen, or a liquid crystal display. Indicia 14 may be letters in any language, numbers, mathematical symbols, artistic illustrations, or any other form of relaying perceptible information such as, but not limited to, visual perception when reading normally or perception by touch when reading braille.

A first concept 16 is created by the combination of the plurality of indicia 14. Concept 16 may be in the form of a sentence, a mathematical equation, or an illustration of an object. A second concept 18 may be presented along with concept 16 or logically flowing therefrom. Concepts 16 and 18 may continue at length until an $n^{th}$ concept is presented. A first separating element 20 is placed across surface 12 after the optimal number of concepts are presented, thereby creating a first section 22 and a second section 24. It is to be understood that although the separating element is presented as a dashed line, it is to be understood that any method may be used to separate a number of sections such as, but not limited to, a solid line, a number of lines, another background and/or another color, another font or size, marks, symbols, or points. In addition, it is also to be understood that the separating elements may be presented in a vertical fashion to provide vertical sections that accommodate languages that are written vertically.

Second section 24 also has a plurality of indicia 14 thereon. A third concept 26 is presented by an alternate combination of indicia 14 such that third concept 26 expands upon first concept 16. Similarly, a fourth concept 28 expands upon second concept 18 and is also presented in second section 24 such that a user may simultaneously view and compare both sections in a preferred embodiment.

In such a presentation, a reader is able to compare the progressive expansion on a concept in a comparative environment that allows the reader to expand on an already learned concept thereby accelerating the learning curve. In addition, when the educational level of each section is equivalent, then the differing sections may be used for differentiating between a thought for thought comparison, thus increasing apprehension of the material. Vocabulary, grammar and writing style are presented simultaneously which facilitates understanding of a more advanced concept by reviewing the same concept as presented in a more simple form in first section 24 or vice-versa. For example, if the reader is reading a concept presented in Elizabethan style in first section 22, such as a Shakespearean play, the same concept may be presented in modem English in second section 24. Thereby, a reader may refer to the modem English presentation to better understand an Elizabethan concept. Similarly, presentations that are metaphorical and/ or have parallel characteristics may more easily be understood and learned by referring to a more simpler presentation of the same concept on the same page.

In a preferred embodiment, a second separating element 30 is presented on surface 12 such that a third section 32 is created. Third section 32 has a plurality of indicia 14 thereon and are combined to present a fifth concept 34 and a sixth concept 36 and may include up to "n" concepts as necessary or that can be accommodated by surface 12. Fifth concept 34 expands upon first concept 16 and third concept 26. Sixth concept 36 expands upon second concept 18 and fourth concept 28. In a preferred embodiment, first section 22, second section 24, and third section 32 are presented to allow simultaneous perception thereof to allow comparative analysis and comprehension. Although three sections are displayed in a preferred embodiment, it is to be understood that there may be an increased or decreased number of sections dictated by the presentation and/or the presenter.

One of the sections may also be converted to include a partially completed concept such that the reader will be required to complete the concept, such as by "filling in the blank," which reinforces the learned material. In addition, one of the sections may be adapted to include pronunciation symbols for the presented concepts to allow phonetic understanding thereof. Also, one of the sections may present a concept in an every day language and another section may present the same concept with a professional emphasis in the language, such as business, engineering, or legal. For example, a concept may be presented in the masculine gender in one section, the feminine gender in another section, and the neutral and correct gender in the other section. Furthermore, the presentation of concepts may be used for advertising purposes to present an evolution from good, to better, to best, which may present the product of the advertiser.

The method or presenting the concepts allows the presenter new opportunities that have not been used heretofore. Previously, presenters have been limited in presenting their material by the level of the perceiver but with the aid 10 concepts can be presented in varying levels of complexity to accommodate a larger audience for the same work. In addition, several presenters may collaborate on the same piece of work wherein a first presenter may present a simple concept that may be expanded upon by a second presenter and so on. While the above description contains many specificities, these should not be construed as limitations on the scope of the invention, but rather as an exemplification of one preferred embodiment thereof. Many other variations are possible without departing from the essential spirit of this invention. Accordingly, the scope of the invention should be determined not by the embodiment illustrated, but by the appended claims and their legal equivalents.

What is claimed is:

1. An information presenting apparatus that functions as an education aid, comprising:
   a plurality of pages in a book;
   at least a first section, a second section, and a third section being simultaneously presented on a majority of said plurality of pages in said book;
   a single sentence being presented in said first section and presenting a subject matter, at least a second sentence being presented in said second section and relaying the same subject matter as said single sentence, and a third plurality of sentences being presented in said third section and presenting the same subject matter or said single sentence and said second sentence; and
   said single sentence, said second sentence, and said third plurality of sentences are presented in a gradually more complex level of comprehension respectively;
   whereby the subject matter of each of said sections can he read and understood by a single user without assistance from a user having a greater reading ability and a more advanced level of comprehension.

2. The invention of claim 1, wherein the second sentence presents the subject matter of said single sentence using synonyms, grammar, and vocabulary at a level of a user having a greater reading ability than a user reading said single sentence.

3. The invention of claim 2, wherein said third plurality of sentences present the subject matter of said single sentence and the second sentence using synonyms, grammar, and vocabulary at a level of a user having a greater reading ability than a user reading said single sentence and the second sentence.

4. The invention of claim 1, wherein the second sentence presents the subject matter of said single sentence using synonyms, grammar, and vocabulary at a level of a user having a greater reading ability than a user reading said single sentence; and said third plurality of sentences present the subject matter of said single sentence and the second sentence using synonyms, grammar, and vocabulary at a level of a user having a greater reading ability than a user reading said single sentence and said second plurality of sentences.

5. The invention of claim 4, wherein said single sentence is in a casual writing style, the second sentences comprises language used in a business field; said third plurality of sentences comprise language used in a legal field.

6. The invention of claim 4, wherein the second sentence presents the subject matter of said single sentence in a parallel writing style; and said third plurality of sentences present the subject matter of the second sentence in a metaphorical writing style.

7. A method of creating an information presenting apparatus for use as a teaching aid, comprising:

providing a plurality of pages in a book;

creating at least a first section, a second Section, and a third section on a majority of said plurality of pages;

presenting a single sentence in said first section that relays a subject matter, presenting at least a second sentence in said second section that relay the same subject matter as said single sentence at a greater level of vocabulary and grammar, and presenting a third plurality of sentences in said third section that relay the same subject matter as said single sentence and said second plurality of sentences at even a greater level of vocabulary and grammar than said second plurality of sentences;

reading the subject matter of each of said sections by a user having a corresponding level of comprehension without the assistance of a user having a greater reading ability and a more advanced level of comprehension.

8. An information presenting apparatus that functions as an education aid, comprising:

at least a surface;

at least a first section, a second section, and a third section being simultaneously presented on said surface;

a single sentence being presented in said first section and presenting a subject matter, at least a second sentence being presented in said second section and relaying the same subject matter as said single sentence, and at least a third sentence being presented in said third section and presenting the same subject matter of said single sentence and the second sentence; and said single sentence, the second sentence, and the third sentence are presented in a gradually more complex level of comprehension respectively;

whereby the subject matter can be read and understood by a single user without assistance firm a user having a greater reading ability and a more advanced level of comprehension.

9. The apparatus of claim 8, wherein said the second sentence presents the subject matter of said single sentence using synonyms, grammar, and vocabulary at a level of a user having a greater reading ability than a user reading said single sentence.

10. The apparatus of claim 9, wherein the third sentence presents the subject matter of said single sentence and said second plurality of sentences using synonyms, grammar, and vocabulary at a level of a user having a greater reading ability than a user reading said single sentence and the second sentence.

11. apparatus of claim 8, wherein the second sentence presents the subject matter of said single sentence using synonyms, grammar, and vocabulary at a level of a user having a greater reading ability than a user reading said single sentence; and the third sentence presents the subject matter of said single sentence and e second sentence using synonyms, granular, and vocabulary at a level of a user having a greater reading ability than a user reading said single sentence and the second sentence.

12. The apparatus of claim 11, wherein said single sentence is in a casual writing style, the second sentence comprises language used in a business field; the third sentence comprises language used in a legal field.

13. The apparatus of claim 11, wherein the second sentence presents the subject matter of said single sentence in a parallel writing style; and the third sentence presents the subject matter of the second sentence in a metaphorical writing style.

14. A method of creating an information presenting apparatus for use as a teaching aid, comprising:

providing at least a surface;

creating at least a first section, a second section, and a third section on said surface;

presenting a single sentence in said first section that relays a subject matter, presenting at least a second sentence in said second section that relays the same subject matter as said single sentence at a greater level of vocabulary and grammar, and presenting at (east a third sentence in said third section that relay the same subject matter as said single sentence and the second sentence at even a greater level of vocabulary and grammar than the second sentence;

reading the subject matter of each of said sections by a user having a corresponding level of comprehension without the assistance of a user having a greater reading ability and a more advanced level of comprehension.

* * * * *